Jan. 14, 1964     W. E. SHOUPP     3,117,913
ELECTRIC GENERATING SYSTEMS
Filed Sept. 27, 1957     3 Sheets—Sheet 1
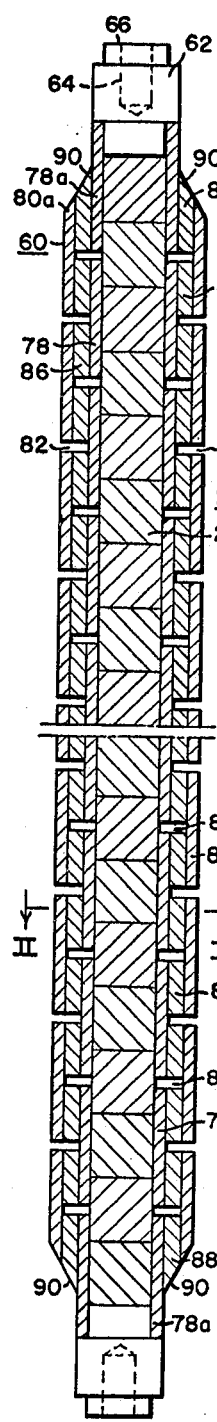
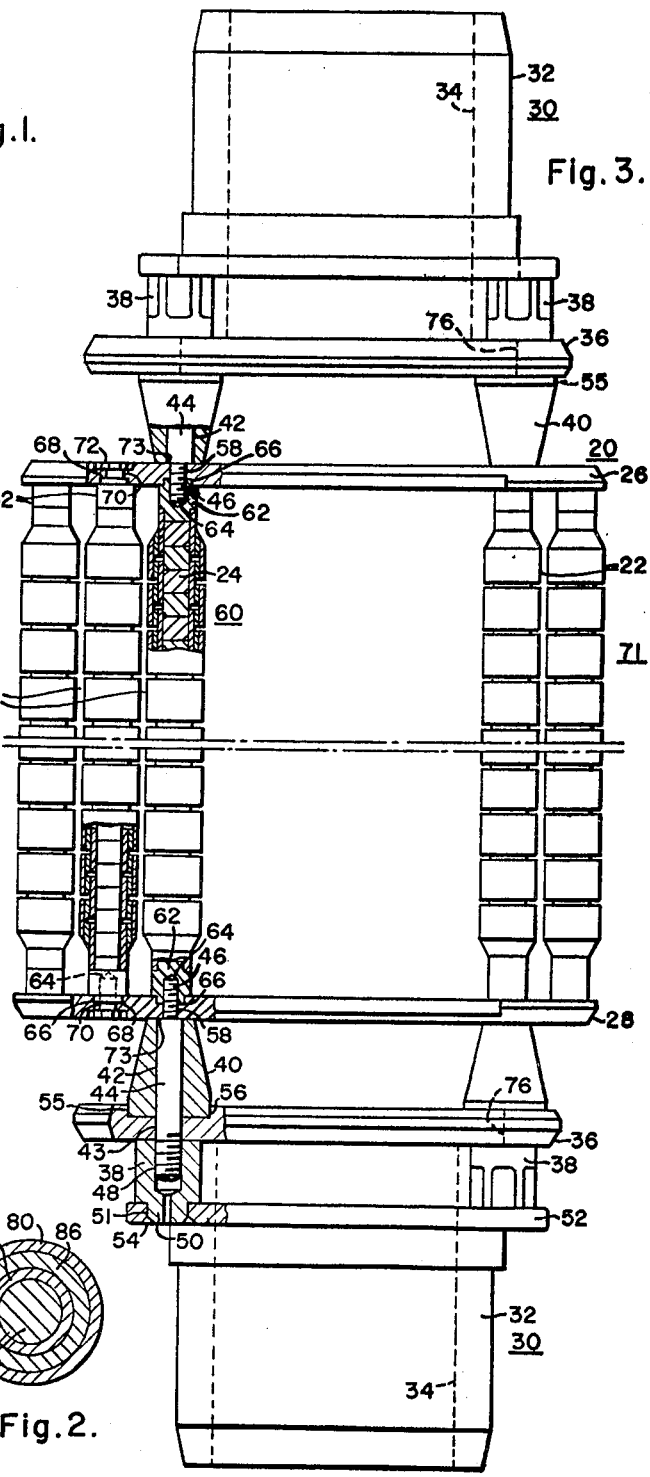

Jan. 14, 1964   W. E. SHOUPP   3,117,913
ELECTRIC GENERATING SYSTEMS
Filed Sept. 27, 1957   3 Sheets-Sheet 3

United States Patent Office 3,117,913
Patented Jan. 14, 1964

3,117,913
ELECTRIC GENERATING SYSTEMS
William E. Shoupp, Pittsburgh, Pa., assignor to Westinghouse Electric Corporation, East Pittsburgh, Pa., a corporation of Pennsylvania
Filed Sept. 27, 1957, Ser. No. 686,777
8 Claims. (Cl. 176—39)

The present invention relates to systems for converting heat directly into electricity and more particularly to systems of the character described adapted especially, but not exclusively, for use in conjunction with a nuclear power plant.

A number of schemes have been proposed heretofore for converting heat or other forms of radiant energy directly into electricity. Such schemes frequently have attempted to utilize the Seebeck or thermocouple effect whereby an electric current is generated, as is well known, by utilizing junctions between appropriate electrically conductive, dissimilar materials. These junctions are then electrically connected into an arrangement in which some of the junctions are maintained at a lower temperature, and the remaining junctions at a higher temperature. In this manner large numbers of segments of these dissimilar materials have been assembled into a so-called thermopile by joining the dissimilar segments in alternation to form hot and cold junctions thereof. Inasmuch as the electrical output from a single thermocouple junction is exceedingly small, an excessive number of such junctions, when assembled in a thermopile, have been required in order to produce a significant amount of electrical power. The number of junctions can be reduced significantly only by maintaining extreme differentials in temperature between the hot and cold junctions of the thermopile in order to generate usable quantities of electrical energy.

Until the present invention, no workable scheme has been disclosed for arranging a thermopile such that a significant quantity of electrical energy can be generated therein. Prior schemes have been found to be inadequate due to difficulties in maintaining a workable and adequate temperature differential between the hot and cold junctions of the thermopile, and in adequately protecting the thermopile from corrosion or erosion caused by exposure to the heating and cooling means therefor. The spatial arrangement of the hot and cold junctions of the thermopile has been complicated by the excessive number of thermocouple junctions which would be required to produce usable quantities of power, and therefore previous arrangements had no convenient and adequate means for segregating the aforesaid hot and cold junctions and for supplying heat to the hot junctions of the pile and cooling the cold junctions thereof. Moreover, the large number of pairs of these dissimilar materials and the junctions therebetween so increased the electrical resistance of the thermopile that the necessary increase in size thereof to compensate the resultant resistance rendered the adequate heating and cooling of the hot and cold junctions, respectively, thereof virtually impossible.

In view of the foregoing it is an object of the invention to provide novel and efficient means for converting heat directly into electricity.

Another object of the invention is to provide a novel and efficient thermopile arrangement adapted particularly for use with a source of nuclear power.

A further object of the invention is to provide a thermopile arrangement wherein the hot and cold junctions thereof, respectively, are adapted for heating and cooling by either gaseous or liquid heat transfer media.

Still another object of the invention is to provide a novel and efficient fuel element adapted for use with a nuclear reactor and having means associated therewith for converting at least part of the heat developed by the chain reaction which is sustained within the reactor directly into electricity.

A still further object of the invention is to provide a heat exchanger adapted for the transfer of heat, between liquid, gaseous and solid materials, or combinations thereof, wherein at least a portion of the heat being transferred is converted directly into electricity.

Another object of the invention is to provide novel and efficient means for reducing or eliminating turbulence in a heat transfer liquid flowing relative to the heat exchanging elements described herein.

Yet another object of the invention is to provide a novel and efficient fuel element assembly adapted for use with a nuclear power reactor.

Other objects of the invention are the provision of means for protecting or cladding the thermopile arrangement of the invention against the corrosive or erosive action of the heating and cooling means for the thermopile and for reducing the electrical resistance thereof while increasing or at least maintaining a given temperature drop through the thermopile between the hot and cold junctions thereof.

These and other objects, features, and advantages of the invention will be made apparent during the ensuing description of exemplary forms thereof with the description being taken in conjunction with the accompanying drawings wherein:

FIGURE 1 is a longitudinal sectional view of a fuel element adapted for use in a nuclear reactor and arranged for converting at least a portion of the nuclear heat developed by the reactor into electricity.

FIGURE 2 is a cross-sectional view of the fuel element shown in FIG. 1 taken along reference lines II—II thereof.

FIGURE 3 is an elevational view, partially in section, of a reactor fuel element assembly constructed in accordance with the present invention.

Figures 4, 5, 6:
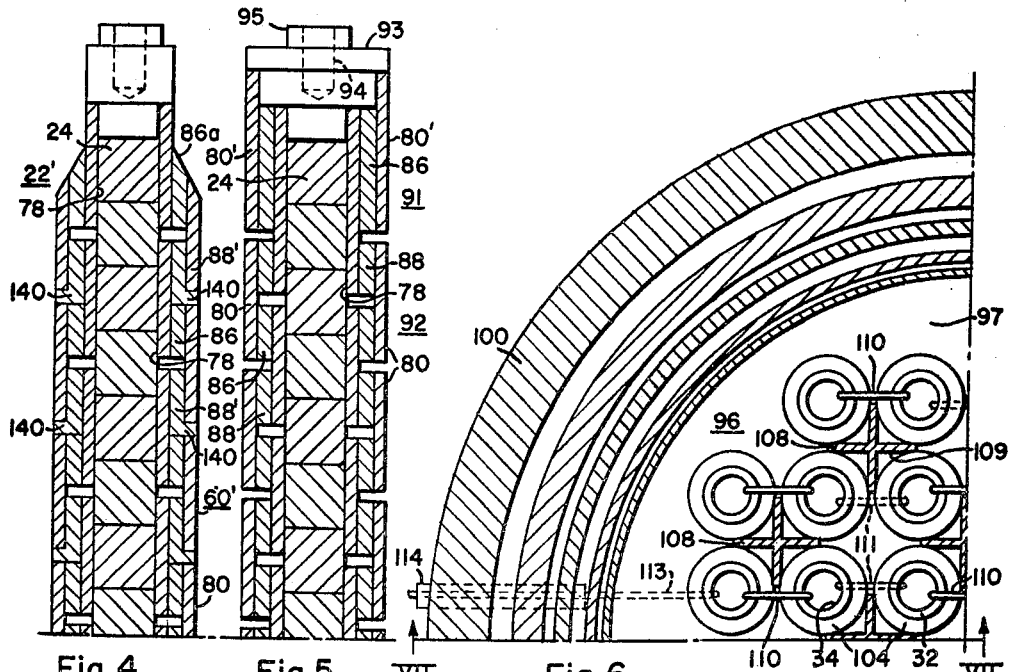
FIGURE 4 is a partial, longitudinal sectional view of another reactor fuel element arranged according to the invention.
FIGURE 5 is a partial longitudinal sectional view of still another reactor fuel element contemplated by the invention.
FIGURE 6 is a sectional view of a portion of a nuclear reactor taken along reference lines VI—VI of FIG. 7 and showing a portion of the top of the reactor core.

According to the invention a thermopile is arranged in the form of a casing fabricated from a series of tubular elements, with the hot and cold junctions of the thermopile being confined respectively to either the interior or the exterior of the casing. Thus all of the hot junctions can be confined, for example, to the interior surface of the casing and are adapted for heating by a source of heat, contained within the casing, or alternatively, by a heated fluid passing therethrough. Therefore, a comparatively large number of the aforesaid casings can be adapted for suspension within a closed vessel and with the cold junctions of the thermopile being confined to the exterior surfaces of the casings, the cold junctions are thus arranged for cooling by a coolant fluid passing through the closed vessel and around the casings contained therein. Suitable well-known means can be utilized for segregating the coolant passing around the tubes from the source of heat or heated fluid contained within or passing through the tubes, or alternatively, the coolant fluid can be segregated from the interior of the tubes by means arranged according to the invention and presently to be described.

In other aspects of the invention it is contemplated that the aforesaid tubular elements be arranged such that the hot thermocouple junctions are disposed exteriorly of the casings while the cold junctions are confined to the interiors of the casings. In this latter arrangement, the coolant material is accordingly passed through the interior of the tubular elements while the heated carrier is maintained outside of the tubular elements. As will be shown hereinafter, this latter arrangement is found to be convenient in some applications wherein a smaller quantity of the cooling medium is required in comparison with that of the heating medium.

In other aspects of the invention, the thermopile arrangement thereof is adapted for association with fuel elements of a heterogeneous type nuclear reactor. In a nuclear reactor of the character described a critical quantity of a neutron-fissionable isotope, such as $U^{233}$, $U^{235}$, or $Pu^{239}$, or mixtures thereof is subjected to fission by absorption of thermal neutrons, with the result that a self-sustaining chain reaction within the isotope is established by an excess of neutrons evolved by the fission. In general the reactor comprises a number of fuel elements of fissionable material, for example natural or enriched uranium encased within a suitable protective covering. The fuel elements are disposed in a neutron slowing material which slows the fast neutrons evolved in each atomic fission to thermal energy levels thereof, at which the neutrons are most efficient to induce fission within the uranium or other atomic fuel. The slowing material is termed a neutron moderator and preferably is formed of a substance having the characteristics of relatively small neutronic capture cross section and relatively large scattering cross section. The heat evolved by the chain reaction is removed generally by passage of a suitable coolant through the reactor core in heat exchanging relationship with the fuel elements disposed therein. Specific details of the operational theory of such reactors are set forth in Enrico Fermi and Leo Sziland Patent No. 2,708,656, dated May 17, 1955.

Referring now more particularly to FIGS. 1 to 3 of the drawings, the illustrative form of the invention exemplified therein is a nuclear reactor fuel element assembly 20 comprising a plurality of elongated fuel elements 22 each containing a number of pellets or rod-like elements 24 formed from a fissile material including, for example, uranium oxide ($UO_2$ or $U_3O_8$). The fuel elements 22 are joined at respective ends thereof to a pair of end plates 26 and 28 in a manner presently to be described in greater detail. To the outward face of each of the end plates 26 and 28 is secured a nozzle assembly 30, which in one example, is substantially similar to that disclosed in the copending application of W. E. Sturtz and Erling Frisch, Serial No. 620,071, filed November 2, 1956, on Rod Type Fuel Assembly, and assigned to the assignee of the present application. Each nozzle assembly 30 accordingly comprises a generally cylindrical flanged nozzle 32 having a coolant flow opening 34 extending therethrough and being assembled spacedly to a mounting plate 36 by means of nuts 38 and associated mounting bolts 44, which are hereinafter described in more detail. The mounting plates 36 are in turn spacedly joined to the outward faces of the end plates 26 and 28, respectively, by means of spacers 40.

Through apertures 42 and 43 in each of the spacers 40 and mounting plates 36, respectively, is inserted the doubly-threaded mounting bolt 44, the inwardly extending threaded portion 46 of which is necked-down for purposes presently to be elaborated upon. The other threaded portion 48 of each bolt 44 is engaged by the associated spacing nut 38. Each of the spacing nuts 38 includes an outwardly extending tubular projection 50 which is inserted into a suitably placed aperture 51 of the nozzle flange 52 and is secured therein by means of an annular weld 54.

Each mounting plate 36 is positioned relative to the adjacent spacers 40 by insertion of the outward, cylindrical end portions 55 thereof into recesses 56 provided on the inward surfaces of the mounting plates 36 and individually surrounding each of the apertures 43 thereof. The nozzle assemblies 30 are secured to the respective end plates 26 and 28 by threading the necked-down portions 46 of each of the mounting bolts 44, with four being utilized in this example for each nozzle assembly, into suitably disposed tapped apertures 58 provided in the end plates 26 and 28. For the purposes presently to be described, the threaded necked-down portions 46 extend a short distance through and inwardly of the end plates 26 and 28.

As pointed out heretofore, a number of elongated rod-like fuel elements 22 are secured to and supported between the end plates 26 and 28. Each of the fuel elements in this example includes a generally tubular hermetically sealed casing or shell 60 into the interior of which are inserted the nuclear fuel pellets 24. After inserting and positioning the pellets 24 within the shell 60, each end thereof is hermetically sealed by a plug member 62, as by welding the plug members to the extremities of the shell 60. Each plug member 62 is provided with a centrally disposed tapped hole 64 and is described more fully in the aforementioned copending application of Sturtz and Frisch. Pursuant thereto, each of the plug members 62 is provided with an annular projection 66 surrounding the tapped hole 64 and adapted to be inserted into a complementary recess 68 formed about the inward ends of the tapped apertures 58 and of additional untapped apertures 70.

When thus inserted into the recesses 68, some of the plug member 62 are engaged and secured relative to the end plates 26 and 28 by threading the inwardly extending threaded portions 46 of the mounting bolts 44 into these plug members, at the time the nozzle assemblies 30 are joined to fuel bundle 71 including the fuel elements 22 and the end plates 26 and 28. The plug members of the balance of the fuel rods 22 previously have been secured relative to the end plates 26 or 28, in this example, by means of fillister-headed bolts 72 inserted through the apertures 70 and threadedly engaging the block members 62, as described in the aforementioned Sturtz and Frisch application. Alternatively, some or all of the plug members 62, in the aforesaid balance of the fuel rods, can be replaced where desired by the threaded and studded plug members described fully in the Sturtz and Frisch application. In this latter arrangement, the apertures 70, of course, would be replaced by tapped apertures.

With this arrangement the end plates 26 and 28, to which are joined all of the fuel elements 22, are secured to and are supported by the nozzle assemblies 30 by threaded engagement of the necked-down portions 46 of the mounting bolts 44 with the tapped apertures 58 of the mounting plates 26 and 28. Moreover, shoulders 73 adjacent the necked-down portions of the mounting bolts serve to position the end plates relative thereto. In this example of the invention, the aforesaid necked-down portions extend inwardly of the mounting end plates 26 and 28 as aforesaid in order to serve the additional or incidental functions of securing an equivalent number of the fuel elements 22 to the end plates 26 and 28, with four being secured in this fashion in the arrangement according to FIG. 3. Thus, the nozzle assemblies 30 are joined primarily to the respective end plates 26 and 28, and the weight of components of the fuel element assembly 20 is distributed among all of the fuel elements 22 and is not necessarily imposed upon the aforementioned four fuel elements.

In this arrangement, the use of tie rods for securing and spacing the end plates 26 and 28 is eliminated and each fuel element 22 is furnished in unitary form extending substantially along the length of the reactor core and the subassembly 20 since the construction of the casings or shell members 60, as presently to be described in connection with certain forms of the invention, is such as to minimize bending or sagging of the individual fuel elements.

For purposes hereinafter pointed out, it also is necessary to obviate the use of the aforesaid tie rods and to provide the fuel elements 22 in a continuous or unitary length thereof. Thus in other applications, the plurality of fuel elements 22 of this invention can be combined into a fuel element assembly thereof according to the teachings of the copending application of Erling Frisch, Serial No. 635,911, filed January 23, 1957, now abandoned, on Fuel Element Assembly for a Nuclear Reactor, and assigned to the assignee of the present application.

As better shown in FIGS. 1 and 2 of the drawings, each of the fuel elements 22 is provided with means for converting directly into electrical energy at least part of the nuclear heat developed in the fuel pellets 24 as a result of the chain reaction sustained within the reactor. The directly conversional means are constructed in the nature of a thermopile or series of thermocouples and at the same time serve as the cladding or casing material for each of the fuel elements 22, required in heterogeneous nuclear reactors to prevent contaminating the reactor coolant. The aforesaid thermocouple and casing means are arranged in one example of the invention, to form the shell 60 for each of the fuel elements 22. The thermocouple arrangement forming part of the shell 60 thus is disposed, in this example of the invention, such that the hot junctions of the arrangement are adjacent the interior of the shell 60 and consequently are adjacent the fuel pellets 24. On the other hand, the cold junctions of the thermocouple series are arranged at the exterior surface of each shell 60. As a result, the cold junctions of the thermocouple arrangement are contacted by the reactor coolant flowing through the openings 34 of the nozzle assemblies 30 and through spaces 74 provided between adjacent fuel elements 22 of the fuel element assembly 20 (FIG. 3). In furtherance of this purpose, a plurality of flow holes are formed in each of the end plates 26 and 28, between the areas of junction of the end plates 26 and 28 with the individual fuel elements 22, as described more fully in the aforesaid copending application of Frisch and Sturtz. A relatively large opening 76 is provided in each of the mounting plates 36 in order to provide an unrestricted flow channel therethrough for the coolant passing from the nozzles 32 and through the end plates 26 and 28.

One form of the aforesaid thermocouple and casing means, arranged to form a fuel element shell 60, includes a plurality of inner and relatively smaller casing sections or cylinders 78 which are spaced longitudinally and co-axially along substantially the entire length of the fuel element 22. Each of the inner cylinders 78 are secured desirably in thermally conductive relationship with adjacent ones of the fuel pellets 24, as by brazing, evaporation of component metal, etc. Those inner cylinders 78 adjacent the respective ends of the fuel element 22 are welded to the plug members 62 described heretofore in connection with FIG. 3 of the drawings. A plurality of outer and relatively larger casing sections or cylinders 80, spatially removed from the inner cylinders, are similarly spaced longitudinally and co-axially along substantially the entire length of the fuel element 22, with the exception that, in this example of the invention, the outer cylinders 80 are relatively closely spaced in order to minimize the width of the gaps 82 therebetween and, therefore, to reduce turbulence or fluid friction in the reactor coolant flowing along the outside of the shell 60. The outer cylinders 80 are further arranged to overlie individually the gaps 84 between the inner cylinders 78 and additionally to overlie desirably equal portions of the pairs of the aforesaid inner cylinders which are respectively adjacent the gaps 84. It will be appreciated that the casing sections 78 and 80 need not be right circular cylinders but can be provided in some other convenient, tubular form.

Between each pair of adjacent, spacedly overlapping portions of the inner and outer cylinders 78 and 80 are disposed in an alternating array, a pair of intermediate cylinders 86 and 88. The intermediate cylinders 86 and 88 are fabricated from a suitable pair of dissimilar thermocouple materials, respectively, and are brazed or otherwise hermetically sealed to the aforesaid overlapping portions of the inner and outer cylinders, in order to provide a fluid-tight casing structure for the nuclear fuel pellets 24. In one example of the invention, the intermediate cylinders 86 are each fabricated from an iron sulphide which is at least preponderantly ferric sulphide ($Fe_2S_3$). On the other hand, the cylinders 88 are fabricated from a complementary thermocouple material comprising an iron sulphide which is at least preponderantly ferrous sulphide (FeS). The materials comprising respectively the intermediate cylinders 86 and 88 and the outer cylinders 80 are secured and sealed in electrically and thermally conductive relationship, to the adjacent components as shown, in any convenient manner, such as by ultrasonic brazing or soldering or by spraying or evaporation of the component material through suitable masks, or the like.

As indicated heretofore, each of the fuel pellets 24 is fabricated, in this arrangement, from an oxidized form of uranium, which permits the fuel elements to operate at a higher temperature thereof, inasmuch as the uranium oxide has many of the characteristics of high temperature ceramic materials. Moreover, because of its electrically insulating characteristic, the uranium oxide obviates the necessity for providing an insulating sleeve (not shown) or other insulating means between the nuclear fuel 24 and the inner cylinders 78 to avoid electrically short-circuiting the inner cylinders 78, into which the fuel pellets 24 are fitted relatively closely. In the fuel element of FIG. 1, a thermopile is provided, as it were, along substantially the entire length thereof, with the inner cylinders 78 connecting the hot junctions of the dissimilar thermocouple elements, represented by the intermediate cylinders 86 and 88, and with the outer cylinders 80 connecting the cold junctions of the thermocouple elements. With this arrangement, then, it is seen that the dissimilar thermoelectric materials comprising the intermediate cylinders 86 and 88, respectively, are coupled in an electrical series along the entire length of the fuel element 22. In order to increase the area of electrical contact between each of the intermediate cylinders 86 or 88 and the inner and outer cylinders 78 and 80 secured thereto, the intermediate cylinders 86 and 88 extend, in their axial direction, substantially the entire length between adjacent inner and outer gaps 84 and 82.

Those intermediate cylinders 86a and 88a which are disposed adjacent the respective ends of the fuel element 22 and the adjacent outer cylinders 80a are beveled outwardly as indicated by the reference character 90 in order to present a relatively smooth contour to the reactor coolant flow passage 74 between adjacent fuel elements 22 (FIG. 3) and thereby to minimize fluid friction in the coolant.

Means for still further decreasing the resistance to coolant flow of the fuel element 22 is illustrated in FIG. 4 of the drawings. In this aspect of the invention, each of the intermediate thermocouple cylinders 88' is arranged to abut on one side thereof the adjacent intermediate cylinder 86 and is provided with an outwardly extending flange 140. The flanges 140 are desirably formed integrally with their associated intermediate cylinders 88' and in addition are arranged to fill precisely the outer gaps 82 between the outer cylinders 80. Since the outward edges of the flanges 140 then are flush with the outer surfaces of the adjacent cylinders 80, an essentially smooth surface is presented to the coolant flowing through the passages 74 of the fuel element assembly 20 and along the length of the fuel elements 22'.

Alternatively, as shown in FIG. 5 of the drawings, the assembly of inner, intermediate and outer cylinders of a fuel element 91 obviously can be rearranged such that a pair of outer cylinders 80' (with one being illustrated in FIG. 5) are the endmost cylinders of a casing or shell 92. Consequently, a relatively larger end plug member 93 is sealed to each of the endmost, outer cylinders 80' in order to close the respective ends of the fuel element 91. Each of the plug members 93 is provided with a centrally disposed, tapped hole, 94 adapted for use in engaging the fillister-head screws 72, noted heretofore, and with an annular projection 95 surrounding the hole 94. The projection 95 desirably is of the same configuration as that of the projection 66 formed upon the aforedescribed plug members 62 and therefore is adapted for insertion into the respective recesses 68 provided on the inward faces of the end plates 26 and 28.

It will be apparent that by combining the structure of FIG. 5 with the outer gap-filling feature of the fuel element 22', exemplified in connection with FIG. 4 of the drawings, the fuel element 91, in this instance, can be formed with a substantially smooth, cylindrical outer surface thereof, which is essentially free of gaps or depressions. Obviously, the cylindrical components 78, 80, 86 and 88', as well as the structural or positional variations thereof, 78a, 80a, 80', 86a, and 88', can be formed with some other cross sectional shape, for an example oval or rectangular, depending upon the desired cross sectional configuration of the fuel element 22, 22', or 91. Herein the term "cross sectional" denotes a section taken perpendicularly to the longitudinal axis of the fuel element or thermocouple casing.

In order to avoid short-circuiting the relatively closely spaced outer cylinders 80, it is necessary to employ as a reactor coolant, an electrically insulating fluid capable of withstanding the customarily high reactor temperatures but, of course, incapable of corroding the internal surfaces of the nuclear reactor. Coolant fluids of this nature include, for example, phenyl, diphenyl, terphenyl, and carbon dioxide.

As stated previously, the intermediate cylinders 86 and 88, are fabricated respectively from dissimilar thermoelectric materials, for an example, ferrous sulphide and ferric sulphide, which are relatively poor conductors of electricity and heat. Therefore these thermoelectric materials are provided in sufficient thicknesses to reduce the electrical resistance thereof to an operable level but more particularly to maintain the desired average temperature differential between the hot and cold junctions of the fuel elements 22, 22', or 91, or that is to say, between the nuclear fuel pellets 24 and the reactor coolant flowing through the passages 74 of the fuel element assembly (FIG. 3). In one example of the invention, the fuel pellets 24 are provided with a diameter of approximately 300 mils while the inner and outer cylinders 78 and 80, respectively, are fabricated from stainless steel, or other corrosion-resistant, electrically conductive material, of a thickness in the neighborhood of 10 to 15 mils. Because of their relatively poor electrical conductivity and because of the necessity of maintaining an adequate temperature differential between the hot and cold junctions of the thermopile, the intermediate cylinders or thermocouple elements 86 and 88 are each provided with a thickness in the order of 25 to 35 mils.

As a result of the relatively increased total wall thickness of the fuel element shell or casing 60, it is conceivable that the masses of nuclear fuel contained in the fuel elements 22, 22', or 91 cannot be as closely spaced as those disclosed in the aforementioned copending applications of E. Frisch and of W. E. Sturtz and E. Frisch. On the other hand, the wider spacing of the fuel elements 22 can be compensated readily by an increase in the uranium inventory of the nuclear reactor or by employing a slightly more enriched fuel, for example, a uranium fuel with a higher percentage of $U^{235}$. However, it will be appreciated that the fuel elements of the reactor will be partially cooled by the well-known operation of the Peltier or inverse thermocouple effect, while part of the nuclear heat is being converted directly into electricity. As a result, a comparatively lesser volume of reactor coolant flow need be maintained through the flow passages 74 of each fuel element assembly 20 (FIG. 3). Therefore, since the flow passages thereof need not be as large as those required in more conventional heterogeneous nuclear reactors, the exterior surfaces of the fuel elements 22, 22' or 91 obviously can be more closely spaced with the result that the increased thickness of the associated casings or shells thereof is at least partly compensated.

In one application of the invention, it has been found that upon maintaining an average temperature differential of 100° C. between the hot and cold junctions of each of the fuel elements, an electrical output of approximately .05 volt per junction is attained. By providing each fuel element, which may be of the order of 100" in length as in several nuclear reactors now contemplated or under construction, with a reasonable plurality of junctions, for an example 70, an electrical output of approximately 3.5 volts per fuel element is realized when the junctions are connected in electrical series along each fuel element to form a thermopile. In those applications wherein a heavy current drain is required, such as in an aluminum processing plant, it is contemplated that all of the fuel elements 22 of each fuel element assembly 20 be coupled electrically in parallel by fabricating each of the end plates 26 and 28 and each of the nozzle assemblies 30 from electrically conductive, desirably corrosion-resistant materials, for example, stainless steel. In this latter case, the respective ends of each of the fuel elements 22 are connected in electrical parallel to the end plates 26 and 28, as well as being physically secured thereto, by the fillister-headed screws 72 or by the mounting bolts 44, as the case may be. In this parallel arrangement of the fuel elements, then, approximately 3.5 volts per fuel element assembly 20 is realized.

In a comparatively large power reactor, such as is contemplated or under construction modernly, a number of fuel elements in the neighborhood of 25,000 is employed. These fuel elements are mounted collectively into a plurality of assemblies 20, numbering in the neighborhood of 100, which are connected in electrical series when mounted within the nuclear reactor, as presently to be described. Thus it will be seen that an electrical output of at least several hundred volts, with extremely high current potentialities can be generated, by the direct conversion of heat into electricity, within the nuclear reactor.

It is also contemplated by the invention that the end plates 26 and 28 of the fuel element assembly 20 can be fabricated from an insulating material, for example aluminum oxide or other ceramic material, and that the individual fuel elements 22, 22' or 91 of the assembly 20 can be coupled in series or into groups of paralleled-series connections in a well-known manner, in order to increase the voltage output of the reactor.

Moreover, these fuel elements similarly can be coupled in electrical series, parallel, or series-parallel arrangements as desired when assembled into the fuel element assembly disclosed in the aforesaid copending application, Serial No. 635,911. By joining the fuel elements laterally, according to the teachings of the last-mentioned copending application, with the use of the metallic conductive ferrules described therein, the fuel elements are at the same time coupled in electrical parallel by the ferrules. When the fuel elements are thus connected, obviously there is no potential difference across the ferrules during operation of the reactor. Alternatively, the fuel elements can be connected electrically in series or in series-parallel, when assembled according to the last-mentioned copending application, by employing ferrules fabricated from aluminum oxide or other high temperature, electrically insulating material for laterally securing those fuel elements of the assembly, which are coupled in series, in order to avoid shorting out these fuel elements. In this latter arrangement, the ends of the fuel elements 22, 22', or 91 are joined by suitable electrical conductors or strips to form the aforesaid electrical series or series-parallel arrangement in the well-known manner.

Figure 7:
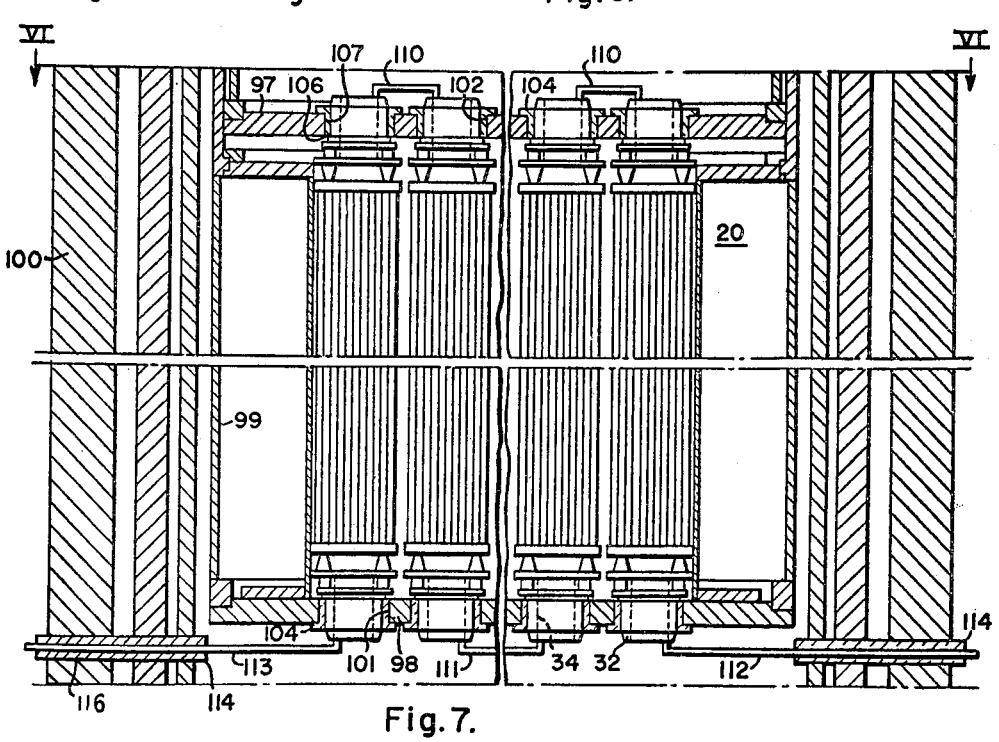
FIGURE 7 is a partial, sectional view of the nuclear reactor illustrated in FIG. 6 and taken along reference lines VII—VII thereof.

As illustrated in FIGS. 6 and 7 of the drawings, a plurality of the fuel element assemblies 20 are supported within a nuclear reactor core 96 partially illustrated in the drawings and comprising an upper core supporting plate 97 and a lower core supporting plate 98, both of which are joined to a cylindrical core casing member 99. The reactor core 96 is supported, by suitable structure (not shown), within a closed reactor vessel indicated generally at 100. Structural and operational details of the nuclear reactor and component equipment are presented in a copending application of Robert J. Creagan, entitled "Neutronic Reactor," Serial No. 686,778, filed September 27, 1957, now abandoned and assigned to the assignee of the present application. Accordingly, a general description of the heterogeneous type reactor described therein, and with which the fuel element and assembly of the present invention is intended to be employed, is not deemed necessary.

Each of the upper and lower core supporting plates 97 and 98 are provided with a plurality of aligned apertures 101 and 102, respectively, into each of which is inserted a flanged ceramic insulating bushing or member 104. In this example, the insulating members 104 are fabricated from one of the ceramic materials noted heretofore. The fuel element assemblies 20 are suspended spacedly within the reactor core by insertion of the flow nozzles 32 thereof respectively into aligned pairs of apertures 101 and 102, with the fuel element assemblies 20 being positioned longitudinally of the reactor core 96 by engagement of nozzle shoulders 106 with the inwardly extending extremities 107 of the insulating members 104, respectively. A plurality of control rods 108, desirably of cruciform configuration, are inserted between selected groups of the fuel element assemblies 20, through suitable apertures 109 (FIG. 6) provided in the upper core supporting plate 97, for the purpose of appropriately controlling the chain reaction sustained within the reactor core 96.

Each of the fuel element assemblies thus are insulated electrically from the upper and lower core supporting plates 97 and 98 and consequently from one another by the intervention of the aforesaid insulation members 104. With this arrangement, all of the fuel element assemblies of the reactor core can be connected in electrical series by upper and lower electrically conductive straps or bars 110 and 111 respectively, as better shown in FIG. 6 of the drawings. Although it is contemplated that all of the fuel element assemblies of the reactor core be coupled in series; for purposes of illustration, only those fuel element assemblies shown in the northwest quadrant of the reactor core, as illustrated in FIGS. 6 and 7, are so coupled. The direct electrical output of the reactor is withdrawn therefrom by means of electrical leads 112 and 113. As better shown in FIG. 7, the leads 112 and 113 extend outwardly through the wall of the reactor vessel 98 and are insulated electrically therefrom by means of a pair of cylindrical insulators 114 individually inserted through apertures 116 in the wall of the reactor vessel and hermetically sealed thereto and to the conductors 112 and 113, respectively.

Figure 8:
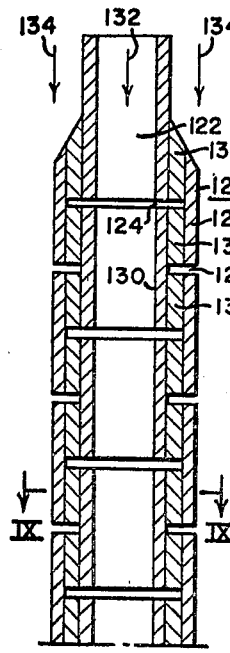
FIGURE 8 is a longitudinal sectional view of one end of a heat exchanger tube or the like constructed according to the teachings of this invention.
Figure 9:
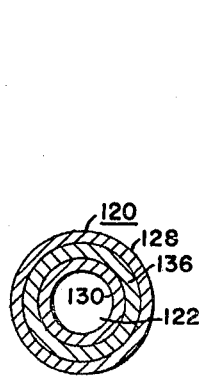
FIGURE 9 is a cross sectional view of the heat exchanger tube of FIG. 8 taken along reference lines IX—IX thereof.

It is contemplated by the invention that the thermoelectric casings constructed in accordance therewith can be mounted as tubular elements in a conventional heat exchanging arrangement whereby heat is transferred between organic or between other electrically non-conductive heat transfer media flowing through and around the tubes, respectively. As better shown in FIGS. 8 and 9 a shell or casing 120 is provided in the form of an an elongated tubular element in order to provide a central passage 122 extending longitudinally therethrough for the conduction of either the hot or the cold fluid of the heat exchanging system. The casing 120 is constructed in a manner similar to that of the shell 60 of the fuel element 22, with the exception that both the inward and outward gaps 124 and 126, respectively, of the casing 120 are arranged as narrowly as feasible without actual electric contact between adjacent pairs of the outer and inner cylinders 128 and 130, respectively. Thus comparatively little resistance is offered to the flow of the heat exchanging fluids indicated, respectively, by the arrows 132 and 134 and flowing relatively to the casing 120.

As explained heretofore in connection with FIGS. 1 and 2 of the drawings, the outer and inner cylinders 128 and 130 are arranged in spaced, overlapping array relative to one another and a number of intermediate cylinders 136 and 138 are disposed in alternating array between the outer and inner cylinders 128 and 130. The intermediate cylinders 138 and 136 are formed from appropriate dissimilar thermocouple elements described heretofore, and are likewise arranged as closely as possible adjacent the gaps 124 and 126 in order to maximize the areas of electrical contact between each of the intermediate thermocouple cylinders 136 and 138 and the respective outer and inner cylinders 128 and 130 secured thereto.

Figures 10, 11:
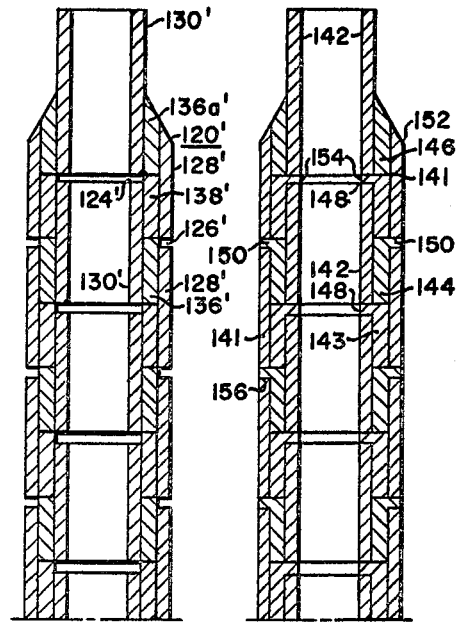
FIGURE 10 is a partial, longitudinal sectional view of another form of a heat exchanger tube constructed according to the invention.
FIGURE 11 is a partial, longitudinal sectional view of still another heat exchanger tube contemplated by the invention.

The thermocouple elements or intermediate cylinders 136 and 138 in another form of the invention are placed in endwise abutting relationship with one another as shown in FIG. 10 of the drawings. In this latter arrangement of the invention, the physical abutment between the intermediate cylinders 136' and 138' increases the bending strength of the casing 120' by partially filling gaps 124' and 126' of the casing 120'. Additionally, the aforesaid abutment minimizes erosion and corrosion of the intermediate cylinders 136' and 138' by reducing the areas thereof exposed to the heat exchanging media. On the other hand the comparatively poor electrical conductivity of these thermocouple elements, in comparsion with the inner and outer cylinders 128' and 130', renders negligible the localized electrical shorting at the areas of physical contact between the intermediate cylinders 136' and 138'.

In FIG. 11 of the drawings, means are illustrated for virtually eliminating the resistance of flow occasioned by the aforesaid gaps existing between outer and inner cylinders 141 and 142, respectively. In this latter arrangement of the invention, each of the intermediate thermocouple cylinders 143 and 144, with the exception of one intermediate end cylinder 146, is provided with a gap filling flange 148 or 150 respectively. The flanges 148 of the intermediate cylinders 143 are arranged to extend inwardly and to fill precisely the gaps between adjacent pairs of inner conductive cylinders 142. On the other hand, the flanges 150 of the intermediate cylinders 144 extend outwardly to fill in the same manner the gaps between the outer cylinders 141. Alternatively, both of the flanges 148 and 150 can be secured to only one intermediate cylinder 142 or 143, if desired. Accordingly, when the tubular elements 152 are employed as heat exchanger tubes, practically no resistance to fluid flow is offered by the inner or outer gaps 154 and 156, respectively of the tubular elements 152. As stated heretofore, due to the relatively poor electrical conductivity of the intermediate thermocouple cylinders 143 and 144 the localized shorting caused by the flanges 148 and 150 is negligible.

In the operation of the nuclear reactor illustrated in FIGS. 6 and 7 of the drawings it is contemplated that an organic or other non-conductive liquid or gaseous coolant, as aforesaid, be caused to flow through the reactor core 96 in order to remove the nuclear heat generated by the chain reaction sustained within the core. In one arrangement contemplated by the invention, wherein each of the fuel elements 22 is provided with ferrous sulphide and ferric sulphide thermocouple elements, as described in connection with FIGS. 1 and 2 of the drawings, an average temperature differential of approximately 100° C. is maintained as aforesaid between the coolant fluid and the nuclear fuel pellets 24. With this arrangement, when utilizing terphenyl or carbon dioxide, or the like, as a coolant, the same can be heated to a temperature sufficient for the production of steam of adequate thermodynamic efficiency, even after removal of part of the reactor heat by direct conversion thereof into electric energy.

Figure 12:
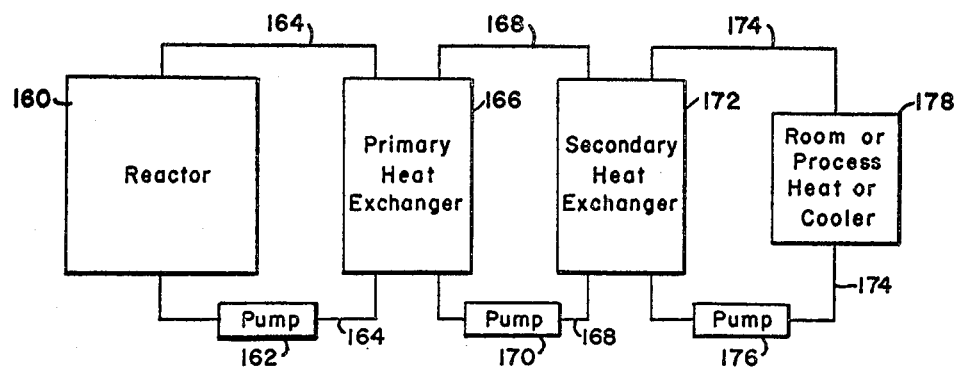
FIGURE 12 is a schematic illustration of one arrangement of a nuclear power plant for generating electrical power directly from nuclear heat, according to the invention.

An alternative arrangement for utilizing nuclear power or other source of heat energy, according to the invention, is illustrated schematically in FIG. 12 of the drawings. In this latter arrangement, a nuclear reactor 160 is provided with a number of the fuel element assemblies 20 (FIGS. 6 and 7) sufficient to establish and to maintain a nuclear chain reaction therein. Suitable pumping means 162 is utilized to maintain a flow of primary coolant through the reactor 160 as indicated by lines 164. Heat is removed from the reactor coolant by passing it through a heat exchanger 166 comprising a plurality of the heat exchanger tubes 120, 120' or 152 described heretofore in connection with FIGS. 9 to 12 of the drawings, and arranged within the heat exchanger 166 in a conventional manner. Within the heat exchanger 166, the heat of the primary coolant, flowing as indicated by the lines 164, is transferred to a secondary coolant fluid which is circulated through conduits 168 by a pump 170. The amount of heat energy successively transferred to the aforesaid primary and secondary coolants is determined by such factors as the type and thickness thermocouple elements utilized in the reactor 160 and in the heat exchanger 166, the sizes of the reactor 160 and of the heat exchanger 166, and the operating temperatures of the fuel elements 22. In the event that adequate heat remains in the aforesaid secondary coolant as determined primarily by these factors, the secondary fluid is circulated through a second heat exchanger 172, constructed in a manner similar to that of the primary heat exchanger 166. The remaining available heat produced by the reactor, after a portion thereof is converted directly into electrical energy by the secondary heat exchanger 172, is transferred to a tertiary coolant. The flow of the tertiary fluid through lines 174 is maintained by a pump 176, and the heat transferred thereto is utilized, if adequate, in room or process heating, or alternatively, is cooled by a suitable cooling means indicated generally by the reference character 178. It will be appreciated that the pumps 162, 170 and 176 can be ganged for operation by a common driving mechanism (not shown), with cognizance being taken of the fact that correspondingly lesser volumes of the associated coolants are moved by the pumps 170 and 176 in comparison with that moved by pump 162. This results from directly converting part of the heat carried by the primary and secondary coolants into electrical energy, as aforesaid. For the same reason, it is desirable in some cases to pass the secondary or tertiary coolant interiorly of the tubular elements in the heat exchanger 166 or 172, respectively, since a lesser volume of the relatively cooler heat transfer medium need be employed.

In other applicative arrangements of the invention, the dissimilar thermoelectric materials are selected desirably, but not necessarily, from a group of mixed valence inorganic compounds such as those described in a copending application of Robert R. Heikes and William D. Johnston entitled "Thermoelements and Devices Embodying Them," filed April 16, 1957, Serial No. 653,245, now abandoned and assigned to the present assignee. As stated in the latter-mentioned application, these compounds have the general formula $Li_mT_{(1-m)}X$, where T represents at least one transition metal from the group including manganese, iron, nickel, cobalt, copper and zinc, X represents a chalcogenide selected from the group comprising oxygen, sulphur, silicon and tellurium, and $m$ has a value not exceeding .1 and not less than .001. A homogeneous solid of this general composition can be employed as the positive element of the pair of thermoelectric materials 86 and 88, 136 and 138, or 143 and 144.

A suitable negative element to cooperate with the aforesaid positive element desirably is composed of a homogeneous solid, as described in the last-mentioned copending application, having the formula $Al_nT_{(1-n)}X$, where T represents one or more transition metals, X has the value previously given, and $n$ has a value of from 0.1 to 0.001.

Other suitable positive and negative thermoelectric components may comprise compounds having the formula $$MZ_{(1 \pm a)}$$

where M represents an element from the group comprising chromium, iron, nickel, copper, cobalt, and manganese, Z represents an element selected from the group including sulphur, selenium, tellurium, arsenic, antimony and bismuth, and $a$ has a positive value of less than 0.1.

As described in the aforesaid application of Heikes and Johnston, highly satisfactory thermoelements can be prepared by combining a member fabricated from a metal selected from the group including copper, silver, copper base alloys, silver base alloys, and molybdenum, and a member of any of the aforesaid positive or negative compounds. The aforesaid positive and negative thermoelectric elements may be prepared as described in the aforesaid application of Heikes and Johnston or in their copending application entitled Process for Producing Lithium Substituted Transition Metal Oxides and Members Prepared Therefrom, Serial No. 580,856, filed April 26, 1956, now Patent No. 2,993,011, and assigned to the present assignee.

As stated heretofore, a plurality of pairs comprising one each of the aforesaid positive and negative thermoelectric materials or other suitable materials of this nature are disposed in conjunction with a thermoelectric fuel element 22, 22' or 91 (FIGS. 1, 4 and 5) and, in this example, are electrically connected in a manner such that the cold junctions of the thermoelectric materials are disposed at the exterior surface of the fuel elements while the hot junctions thereof are arranged at the internal surface of the fuel element casings 60, 60' or 92. Accordingly, the hot junctions of the thermopile composed in this manner are each disposed for heating by fuel pellets 24 of each fuel element, and the cold junctions thereof are arranged for cooling by the coolant fluid passing through the flow nozzles 32 and flow passages 74 of the fuel element assembly 20.

Similarly, the aforesaid positive and negative thermoelectric materials can be employed in conjunction with the tubular heat exchanger elements 120, 120', and 152 (FIGS. 8, 10 and 11) and arranged such that their hot junctions are heated by a relatively hot fluid passing therethru and their cold junctions are cooled by a relatively cold fluid flowing exteriorly thereof, or vice versa.

When employing the thermoelectric materials described in the last-mentioned copending application, a thermoelectric power of the order of 500 to 1000 microvolts per degree centigrade can be realized for each junction formed between the aforesaid dissimilar materials. These materials have the further advantage that both the ohmic resistivity and the thermoconductivity thereof are extremely low. Specifically, in certain types of such materials, the resistivity of the material is of the order of $10^{-2}$ ohm per centimeter while the thermoconductivity is of the order of only 0.02 watt per centimeter per degree centigrade. It follows then that a relatively large temperature differential that is to say in the order of 500° C. average, can be maintained between the hot and cold junction of a thermopile formed between these materials in the thicknesses indicated heretofore and that a relatively large number of thermocouples can be employed therein without excessively increasing the ohmic resistivity of the thermopile. Any usable heat remaining in the reactor coolant in this latter arrangement can be extracted and directly converted to electrical energy, if desired, by means of an external thermoelectric heat exchanger, such as that described heretofore, in connection with the heat exchanger 166 or 172 of FIG. 12.

From the foregoing it will be apparent that novel and efficient means have been disclosed for transferring heat energy directly into electrical power. Such means although adapted particularly for use in conjunction with a nuclear reactor, additionally can be adapted with equal facility for use in or with conventional heat producing facilities for converting at least part of the heat thereof directly into electrical energy. The heat exchanger disclosed herein likewise is readily adaptable for use in auxiliary equipment associated with a nuclear power plant or with conventional heat generating plants.

Therefore, numerous modifications of the exemplary forms of the invention disclosed herein will appear to those skilled in the art without departnig from the scope of the appended claims. Moreover, it is to be understood that certain features of the invention can be utilized without corresponding use of other features thereof.

Accordingly, what is claimed as inventive is:

1. In a nuclear reactor the combination comprising a vessel, a plurality of fuel assemblies supported within said vessel, said assembiles each comprising a plurality of elongated fuel elements, all of said elements together including sufficient quantity of fuel material to support a chain reaction, each of said fuel elements being enclosed in a casing including a plurality of pairs of axially displaced thermoelectrically dissimilar members and a number of conductive members electrically connecting said dissimilar members so as to form a thermoelectric series along the length of the fuel element, means for electrically connecting the fuel elements of each fuel assembly in parallel, said means including a pair of spaced conductive end plates mounted on each assembly and joined to the ends respectively of the fuel elements thereof, said fuel elements including means for electrically connecting the endmost conductive members of their associated thermoelectric series to said end plates respectively, means for mounting said fuel assemblies within said vessel in electrically insulated relation with one another and with said vessel, and additional conductive means for electrically connecting the end plates of said assemblies in electrical series and for conducting the electric energy formed in said assemblies out of said vessel.

2. An energy converter comprising a plurality of elongated generally tubular heat exchange casings, means for circulating fluids at differing temperatures through and exteriorly of respectively said casings in order to induce transfer of heat across said casings, a vessel, and means for mounting said casings in a relatively closely spaced array within said vessel, each of said casings including a plurality of pairs of thermoelectrically dissimilar segments axially displaced along the length thereof, said dissimilar segments being arranged in alternation along said length, a number of axially spaced outer tubular segments mounted respectively upon the outer surfaces of adjacent pairs of said dissimilar segments, each outer tubular segment being coextensive with the combined outer surfaces of the associated pair of dissimilar segments and being sealed thereto in thermally and electrically conductive relation so that in addition the outer tubular segments serve as protective cladding for the external surfaces of said dissimilar segments, a number of inner tubular segments spaced axially along the length of said casing in an alternating array relative to said outer tubular segments, said inner segments being mounted respectively on the internal surfaces of other adjacent pairs of said dissimilar segments and being sealed thereto in electrically and thermally conductive relation, each of said inner segments covering the combined internal surfaces of the associated pair of dissimilar segments so that said inner segments serve as protective cladding for the internal surfaces of said dissimilar segments, said inner and said outer segments forming a thermoelectric series with said dissimilar segments along the length of each of said casings with the hot thermocouple junctions of said series disposed on one side of said casing and the cold thermocouple junctions thereof being disposed on the other side of said casing, and means for electrically connecting said casings and for withdrawing electric energy therefrom out of said vessel.

3. In an electrical energy converter, the combination comprising a plurality of elongated generally tubular heat exchange casings, a vessel, means for mounting said casings in a spaced array within said vessel, and means for applying heat to one side of each of said casings and for removing heat from the other side thereof to induce heat transfer through the walls of said casings, each of said casings including a plurality of pairs of thermoelectrically dissimilar generally tubular segments spaced axially along the length thereof, said dissimilar segments being arranged in alternation along said length, a number of generally tubular outer conducting segments axially spaced along said length and secured respectively to the external surfaces of adjacent pairs of said dissimilar members, said outer segments being sealed to said last-mentioned pairs in thermally and electrically conductive relation therewith and each of said outer segments substantially coextending with the combined external surfaces of its associated pair of dissimilar segments so as to form protective cladding therefor, a number of generally tubular inner conducting segments axially spaced along said length in alternating serpentine relation with said outer segments, said inner segments being mounted upon other adjacent pairs respectively of said dissimilar segments and being sealed thereto in thermally and electrically conductive relation, each of said inner segments substantially coextending with the combined internal surface areas of its associated pair of dissimilar segments so as to form protective cladding therefor, said inner and said outer segments thereby connecting said dissimilar segments into thermoelectric series along the length of each of said casings with the hot thermocouple junctions thereof being disposed at said one side of said casings and the cold thermocouple junctions thereof being disposed at said other side of said casings, conductive means for electrically connecting said casings into a number of parallel connected groups and for connecting said groups into electrical series, and circuit means for withdrawing the electric energy developed in said parallel-series arrangement from said vessel.

4. In a nuclear reactor the combination comprising a vessel, a plurality of fuel assemblies, means for spacedly mounting said assemblies within said vessel in electrically insulated relation with one another and with said vessel, said assemblies each including a plurality of elongated fuel elements, all of said elements together containing sufficient quantity of fuel material to support a chain reaction, each of said fuel elements having a casing enclosing the fuel material therein and including a plurality of pairs of thermoelectrically dissimilar tubular segments spaced axially along the length thereof and arranged in an alternating array, a number of generally tubular outer conducting segments spaced axially along said length and mounted respectively on the external surfaces of adjacent pairs of the dissimilar segments, said outer segments being sealed to said external surfaces in thermally and electrically conductive relation therewith and each of said outer segments coextending with the combined surface areas of its associated pair of dissimilar segments so as to serve as protective cladding therefor, a number of generally tubular inner conductive segments spaced axially along the length of the casing in serpentine alternating relation with said outer segments and mounted respectively on the internal surfaces of other adjacent pairs of the dissimilar segments, said inner segments being sealed to said internal surfaces in electrically and thermally conductive relation therewith and each of said inner segments being substantially coextensive with the combined internal surface areas of its associated pair of dissimilar segments so as to serve as protective cladding therefor, said inner and said outer segments connecting said dissimilar segments in thermoelectric series along the length of the casing so that hot thermocouple junctions are formed internally thereof at positions adjacent said fuel material and cold thermocouple junctions are formed externally thereof, and means for electrically connecting the respective thermoelectric series of said casings and for withdrawing the electric energy generated therein from said vessel.

5. A fuel element for a nuclear reactor, said element comprising an elongated generally tubular casing, a quantity of fuel material inserted within said casing, and means for closing the ends of said casing, said casing including a plurality of pairs of thermoelectrically dissimilar generally tubular segments spaced axially along the length of said casing, said dissimilar members being disposed in an alternating array relative to one another, a number of generally tubular outer conducting segments spaced axially along the length of said casing and mounted respectively on the external surfaces of adjacent pairs of the dissimilar segments, said outer segments being sealed to said external surfaces in thermally and electrically conductive relation therewith and each of said outer segments substantially coextending with the combined external surface areas of its associated pair of dissimilar segments so as to provide protective cladding therefor, a number of generally tubular inner conducting segments spaced axially along the length of said casing in serpentine alternating array relative to said outer segments, said inner segments being mounted respectively on the internal surfaces of other adjacent pairs of the dissimilar members and being sealed thereto in electrically and thermally conductive relation therewith, each of said inner segments being substantially coextensive with the combined internal surface areas of its associated pair of dissimilar segments so as to provide protective cladding therefor, said inner and said outer segments electrically connecting said dissimilar segments in thermoelectric series along the length of said casing with hot thermocouple junctions thereof being disposed at the inner surface of said casing at a position adjacent said fuel material and cold thermocouple junctions thereof being disposed at the exterior of said casing.

6. A fuel element for a nuclear reactor, said element comprising an elongated generally tubular casing, a quantity of fuel material inserted within said casing, means for closing the ends of said casing, said casing including a plurality of pairs of thermoelectrically dissimilar generally tubular segments spaced axially along the length of said casing, said dissimilar members being disposed in an alternating array relative to one another, a number of generally tubular outer conducting segments spaced axially along the length of said casing and mounted respectively on the external surfaces of adjacent pairs of the dissimilar segments, said outer segments being sealed to said external surfaces in thermally and electrically conductive relation therewith and each of said outer segments substantially coextending with the combined external surface areas of its associated pair of dissimilar segments so as to provide protective cladding therefor, a number of generally tubular inner conducting segments spaced axially along the length of said casing in serpentine alternating array relative to said outer segments, said inner segments being mounted respectively on the internal surfaces of other adjacent pairs of the dissimilar members and being sealed thereto in electrically and thermally conductive relation therewith, each of said inner segments being substantially coextensive with the combined internal surface areas of its associated pair of dissimilar segments so as to provide protective cladding therefor, said inner and said outer segments electrically connecting said dissimilar segments in thermoelectric series along the length of said casing with hot thermocouple junctions thereof being disposed at the inner surface of said casing at a position adjacent said fuel material and cold thermocouple junctions thereof being disposed at the exterior of said casing, and generally annular gap-filling means mounted on some of said dissimilar segments for filling the axial gaps between said outer segments.

7. Elongated generally tubular heat exchanging means comprising a plurality of pairs of thermoelectrically dissimilar generally tubular segments spaced axially along the length of said heat exchanging means in alternating relation with one another, a number of generally tubular outer conducting segments mounted respectively on the external surfaces of adjacent pairs of the dissimilar members and spaced axially along the length of said heat exchanging means, said outer segments being sealed to said external surfaces in thermally and electrically conductive relation therewith and each of said segments being substantially coextensive with the combined external surface areas of its associated pair of the dissimilar segments so as to form a protective cladding therefor, a number of generally tubular inner conducting segments mounted on the internal surfaces of other adjacent pairs of the dissimilar members and spaced axially along the length of said heat exchanging means, said inner segments being sealed to said internal surfaces in thermally and electrically conductive relation therewith and being disposed in a serpentine alternating array relative to said outer segments, each of said inner segments being substantially coextensive with the combined internal surfaces of its associated pair of dissimilar members so as to form a protective cladding therefor, said inner and said outer segments connecting said dissimilar segments in thermoelectric series along the length of said heat exchanging means.

8. Elongated generally tubular heat exchanging means comprising a plurality of pairs of thermoelectrically dissimilar generally tubular segments spaced axially along the length of said heat exchanging means in alternating relation with one another, a number of generally tubular outer conducting segments mounted respectively on the external surfaces of adjacent pairs of the dissimilar members and spaced axially along the length of said heat exchanging means, said outer segments being sealed to said external surfaces in thermally and electrically conductive relation therewith and each of said segments being substantially coextensive with the combined external surface areas of its associated pair of the dissimilar segments so as to form a protective cladding therefor, a number of generally tubular inner conducting segments mounted on the internal surfaces of other adjacent pairs of the dissimilar members and spaced axially along the length of said heat exchanging means, said inner segments being sealed to said internal surfaces in thermally and electrically conductive relation therewith and being disposed in a serpentine alternating array relative to said outer segments, each of said inner segments being substantially coextensive with the combined internal surfaces of its associated pair of dissimilar members so as to form a protective cladding therefor, said inner and said outer segments connecting said dissimilar segments in thermoelectric series along the length of said heat exchanging means, and gap-filling means mounted on at least some of said dissimilar segments and disposed so as to extend radially into the adjacent axial gaps among at least some of said conducting segments.

References Cited in the file of this patent

UNITED STATES PATENTS

| | | |
|---|---|---|
| 529,711 | Cox | Nov. 27, 1894 |
| 546,417 | Cox | Sept. 17, 1895 |
| 724,572 | Hall | Apr. 7, 1903 |
| 928,089 | Vokel | July 13, 1909 |
| 1,664,720 | Woodruff | Apr. 3, 1928 |
| 2,456,070 | Malek et al. | Dec. 14, 1948 |
| 2,734,344 | Lindenblad | Feb. 14, 1956 |
| 2,811,568 | Lloyd | Oct. 29, 1957 |
| 2,902,423 | Luebke et al. | Sept. 1, 1959 |

FOREIGN PATENTS

| | | |
|---|---|---|
| 618,508 | Great Britain | Feb. 23, 1949 |

OTHER REFERENCES

TID–7515 (Part 2), August 1956, pp. 197, 273, 292, 294.

The British Journal of Applied Physics, vol. 8, 1957, pp. 179–189.

The Physical Review, vol. III, No. 6, September 15, 1958, pp. 1493–1496.